(12) United States Patent
Haberman et al.

(10) Patent No.: US 12,429,077 B2
(45) Date of Patent: Sep. 30, 2025

(54) DRYER SCREEN QUICK RELEASE LATCH

(71) Applicant: Carter Day International, Inc., Minneapolis, MN (US)

(72) Inventors: Matthew Thomas Haberman, Mahtomedi, MN (US); Robert Scott Libke, Mound, MN (US)

(73) Assignee: MAAG GALA, INC., Eagle Rock, VA (US)

( * ) Notice: Subject to any disclaimer, the term of this patent is extended or adjusted under 35 U.S.C. 154(b) by 703 days.

(21) Appl. No.: 17/732,059

(22) Filed: Apr. 28, 2022

(65) Prior Publication Data

US 2022/0347889 A1 Nov. 3, 2022

Related U.S. Application Data (60) Provisional application No. 63/180,928, filed on Apr. 28, 2021.

(51) Int. Cl.
*F16B 2/18* (2006.01)
*B29B 13/06* (2006.01)
*F26B 5/08* (2006.01)

(52) U.S. Cl.
CPC .......... *F16B 2/185* (2013.01); *B29B 13/065* (2013.01); *F26B 5/08* (2013.01)

(58) Field of Classification Search
CPC .......... F16B 2/185; B29B 13/065; F26B 5/08; F26B 17/101; F26B 17/102; F26B 17/22
See application file for complete search history.

(56) References Cited

U.S. PATENT DOCUMENTS

| | | | |
|---|---|---|---|
| 2,873,495 A | 2/1959 | Love | |
| 3,432,197 A * | 3/1969 | Graves | F16B 1/00 411/85 |
| 5,462,318 A * | 10/1995 | Cooke | E05C 19/14 292/113 |
| 6,138,375 A | 10/2000 | Humphries, II et al. | |
| 6,438,866 B1 | 8/2002 | Meydell et al. | |
| 2006/0163885 A1* | 7/2006 | Eriksson | F16B 2/185 292/247 |

(Continued)

OTHER PUBLICATIONS

International Patent Application No. PCT/ US2022/026767, International Search Report and Written Opinion mailed Sep. 28, 2022, 11 pages.

*Primary Examiner* — David M Upchurch
(74) *Attorney, Agent, or Firm* — Fredrikson & Byron, P.A.

(57) ABSTRACT

A rotary dryer can include a screen that is divided into different portions joined together to form the screen structure. The screen portions can be joined together using one or more quick release latches. Each latch can provide a locking connection between the different screen portions. The latch can be unlocked, e.g., using hand pressure, to disconnect one screen portion from an adjacent screen portion. This can allow quick replacement of one or both screen portions with replacement screen portion(s). The latch may include a latch body and a latch rod. The latch rod may be rotatably connected to the latch body. The latch rod can be connected to one screen portion and the latch body connected to another screen portion. The latch body can rotate around the rotatable connection, causing the screen portions to be pulled together for subsequent use of the screen structure.

10 Claims, 12 Drawing Sheets

(56) References Cited

U.S. PATENT DOCUMENTS

| | | |
|---|---|---|
| 2010/0037477 A1 | 2/2010 | Veltel et al. |
| 2013/0015678 A1* | 1/2013 | Williamson ........... B60J 7/1607 |
| | | 296/100.09 |
| 2016/0325406 A1* | 11/2016 | Huelsmann ............... B25B 5/16 |

* cited by examiner

DRYER SCREEN QUICK RELEASE LATCH

RELATED APPLICATIONS

This application claims priority to U.S. Provisional Patent Application No. 63/180,928, filed Apr. 28, 2021, the entire contents of which is incorporated herein by reference.

TECHNICAL FIELD

The disclosure relates to latching arrangements, particularly for dryer screen systems.

BACKGROUND

Raw plastics manufacturers produce a liquid product that is extruded in a tubular form from an extruder. The product is extruded under water and then cut into small pieces, tending to form generally spherically shaped particles or beads as it cools. This plastic bead/water slurry is then transported to a dryer to remove the water from the plastic product so that the product can be shipped to other manufacturers to manufacture useful products.

Before shipment, the raw plastic product must be dried. This can be accomplished with the use of a centrifugal dryer. Typically such dryers force water from the product by striking the water-laden product against a screen, forcing the water through the screen and into a water collection space, thus allowing gravity to drive the water downwardly into a water basket and out of the dryer system through a drain pipe.

These dryer systems may use various screens that have different sized holes to handle different materials. As such, the screens may be removable so that the same dryer system can handle multiple different materials. Screens may also need to be replaced due to damage sustained in the overall drying process.

SUMMARY

In general, this disclosure is directed to quick release latches, dryer screen systems incorporating such quick release latches, and associated techniques. In some examples, a latch according to the disclosure provides a mechanical connection between different screen portions of a rotary dryer. The latch can be used to provide a locking connection between the different screen portions, e.g., to form a combined screen structure that particulate matter being processed cannot bypass during operation. The latch can be unlocked, e.g., using hand pressure without the aid of a tool, to disconnect one screen portion from an adjacent screen portion. This can allow quick replacement of one or both screen portions with replacement screen portion(s). For example, if one screen portion is damaged and/or if an operator desires to change the aperture size on the screen, the operator can quickly detach the screen portions from each other and replace one or multiple of the screen portions.

In some implementations, the latch includes an axel, pin, and/or other rotatable mechanical coupling that engages with a first screen portion. The latch can also include a rod operatively extending from the rotatable mechanical coupling to a handle. The handle may include a clasp and/or other rotatable mechanical coupling operatively connected to a second screen portion to provide a rotatable mechanical connection with respect to the second screen portion. In use, the handle may be rotated about the clasp, causing the rod connected to the handle to pull in a direction corresponding to the directional movement of the handle. In turn, this can pull the first screen portion and second screen portion together. In some examples, the latch includes an actuator, such as an adjustment knob, to adjust the working length of the rod and, correspondingly, the length of caused by rotation of the handle.

In one example, a screen system is described that includes a plurality of screen portions, a latch rod, and a latch body. The plurality of screen portions include a first screen portion having a terminal end and a second screen portion having a terminal end. The terminal end of the first screen portion includes a bracket housing an axel and the terminal end of the second screen portion defines a hinge receiving cavity. The example specifies that the latch rod extends from a first end to a second end, and the first end of the latch rod is operatively connected to the axel in the bracket housing. The latch body includes a clasp end and having a pin rotatable relative to the latch body. The latch rod is operatively connected to the pin. The example specifies that the clasp end of the latch body is inserted into the hinge receiving cavity of the second screen portion to form a rotatable connection therebetween and the latch body is configured to rotate around the rotatable connection formed between the hinge receiving cavity and the clasp end of the latch body, thereby pulling the pin and the second end of the latch rod inserted therethrough away from the first screen portion.

In another example, a method of assembling a screen system is described. The method includes connecting a first end of a latch rod to a bracket on a terminal end of a first screen portion of a plurality of screen portions, the bracket housing an axel. The method further includes guiding, from a second end of the latch rod, the latch rod through a pin of a latch body, the latch body including a clasp end. The method also includes inserting the clasp end of the latch body into a hinge receiving cavity of a terminal end of a second screen portion of a plurality of screen portions. In some implementations, the method also involves rotating the latch body around the rotatable connection formed between the hinge receiving cavity and the clasp end of the latch body, thereby pulling the pin and the second end of the latch rod inserted therethrough away from the first screen portion.

In another example, a latch body is described that includes a clasp end, where the clasp end is configured to be inserted into a hinge receiving cavity of a terminal end of a first screen portion of a plurality of screen portions, and a pin rotatable relative to the latch body, the pin defining a latch rod receiving opening extending therethrough that receives a latch rod extending from a first end to a second end. The example specifies that a terminal end of a second screen portion includes a bracket housing an axel, the first end of the latch rod is operatively connected to the axel in the bracket housing, and the pin sits along the latch rod at a position where an adjustment knob is secured around the latch rod between the pin and the second end of the latch rod, where the adjustment knob is movable along the latch rod to adjust a distance between the first end of the latch rod and the adjustment knob. The example also specifies that the latch body is configured to rotate around the rotatable connection formed between the hinge receiving cavity and the clasp end of the latch body, thereby pulling the pin and the second end of the latch rod inserted therethrough away from the first screen portion.

The details of one or more examples are set forth in the accompanying drawings and the description below. Other features, objects, and advantages will be apparent from the description and drawings, and from the claims.

DETAILED DESCRIPTION

Figure 1:
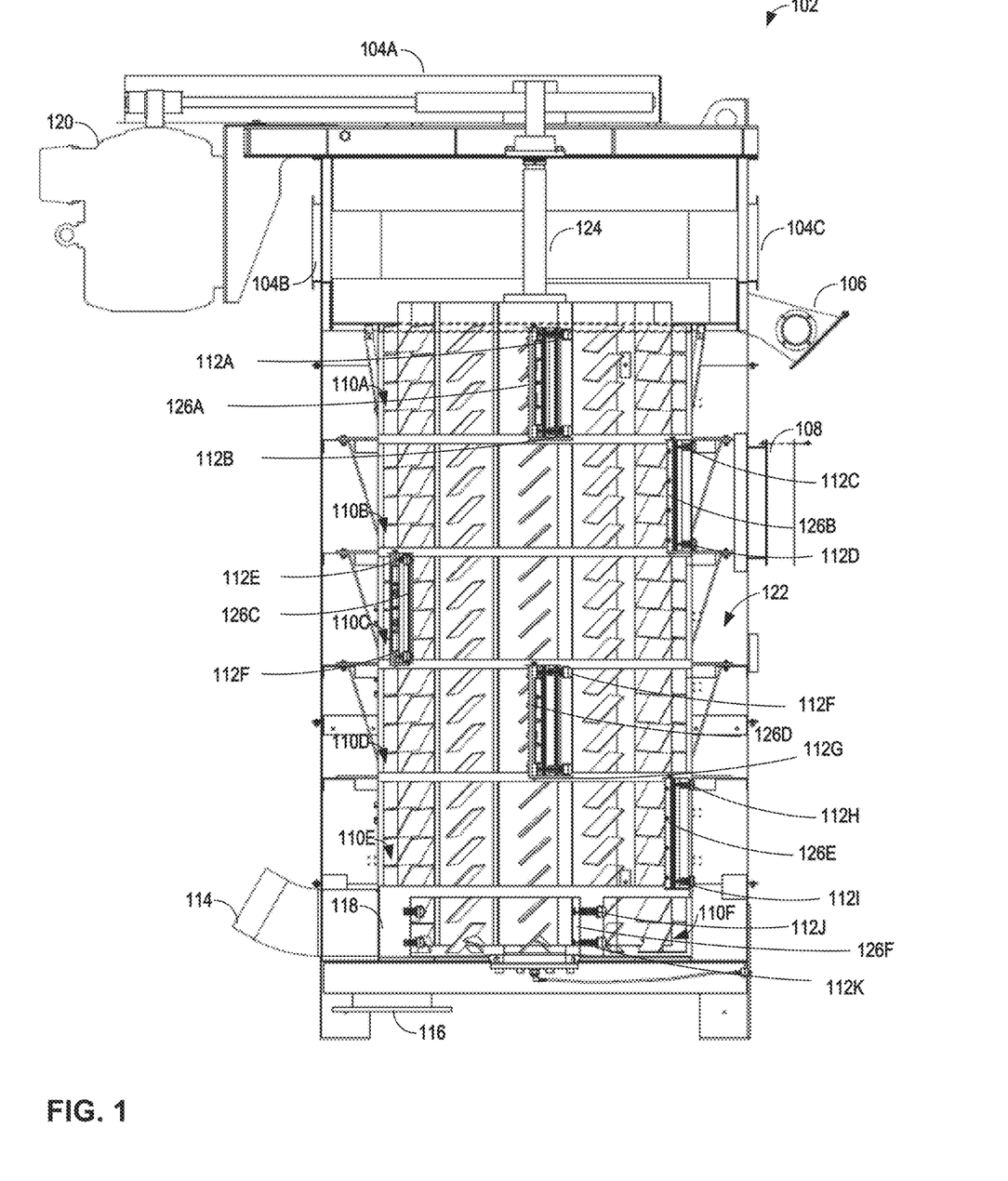
FIG. 1 is a side view of a centrifugal pellet dryer that may utilize one or more latches in accordance with one or more aspects of the current disclosure.

FIG. 1 is a side view of a centrifugal pellet dryer 102 that can utilize one or more latches in accordance with one or more aspects of the current disclosure. A product slurry, such as a plastic bead or sphere/water mixture, is introduced into dryer 102 by means of a slurry inlet pipe 114. As illustrated in FIG. 1, slurry inlet pipe 114 introduces the product slurry into the center of the dryer section and along the axis of rotation of the rotor 124. The center inlet for the slurry provides additional suction and capacity, making the operation of the motor more efficient and providing a more efficient initial water discharge from the product. Dried product is removed from the dryer 102 through a product discharge chute 106 while water removed from the dried product is removed from the reservoir section through a water outlet pipe 116.

It will be further observed that the slurry inlet pipe 114 enters the reservoir tank 122 through the side wall thereof into the interior of the reservoir tank 122. In some examples, reservoir tank 122 may include scraper blades, which are not shown in FIG. 1. The slurry inlet pipe 114 then bends upward as shown. The slurry inlet pipe 114 is in fluid communication with dryer 102. Dryer 102 also includes air inlet pipe 104, air outlet pipe 108, and motor 120. In the example of FIG. 1, air inlet pipe 104 may be the only air inlet option, although other examples may include air scoops or other air inlet options.

Dryer 102 can include multiple screens (not pictured) in screen locations 110A-110F (collectively, screen locations 110) that are spaced apart to define a tubular shaped volume. Each of the screens may include one or more screen portions. In some examples, screen portions may include opposite edges of a singular screen (e.g., a unitary screen structure with a dividing line to form opposite edge that are joined together upon installation). In other examples, a screen portion may include a section of a screen that is connected to one or more other screen portions to make up the entirety of one of the screens. The screen portions of the screens may be connected to one another and/or to the internal structure of dryer 102 (e.g., disruptor bars 126), by one or more latches 112A-112K (collectively, latches 112) and one or more disruptor bars 126A-126F (collectively, disruptor bars 126).

In the example of FIG. 1, each of screens 110 includes two screen portions that are semi-circular in shape and connect to one another using a pair of latches 112. Further details on latches 112 for securing screens 110 are shown are shown and described with respect to FIGS. 2-11. With respect to FIG. 1, it should be appreciated that dryer 102 is only one example application that can utilize a latch according to the disclosure, and the disclosure is not limited in this respect. Additional detail regarding dryer 102, including description of the functionality and structure of dryer 102, can be found in U.S. Pat. No. 5,987,769 to Hauc, et al., and U.S. Pat. No. 6,938,357 to Hauch, each of which are incorporated herein by reference.

Figure 2:
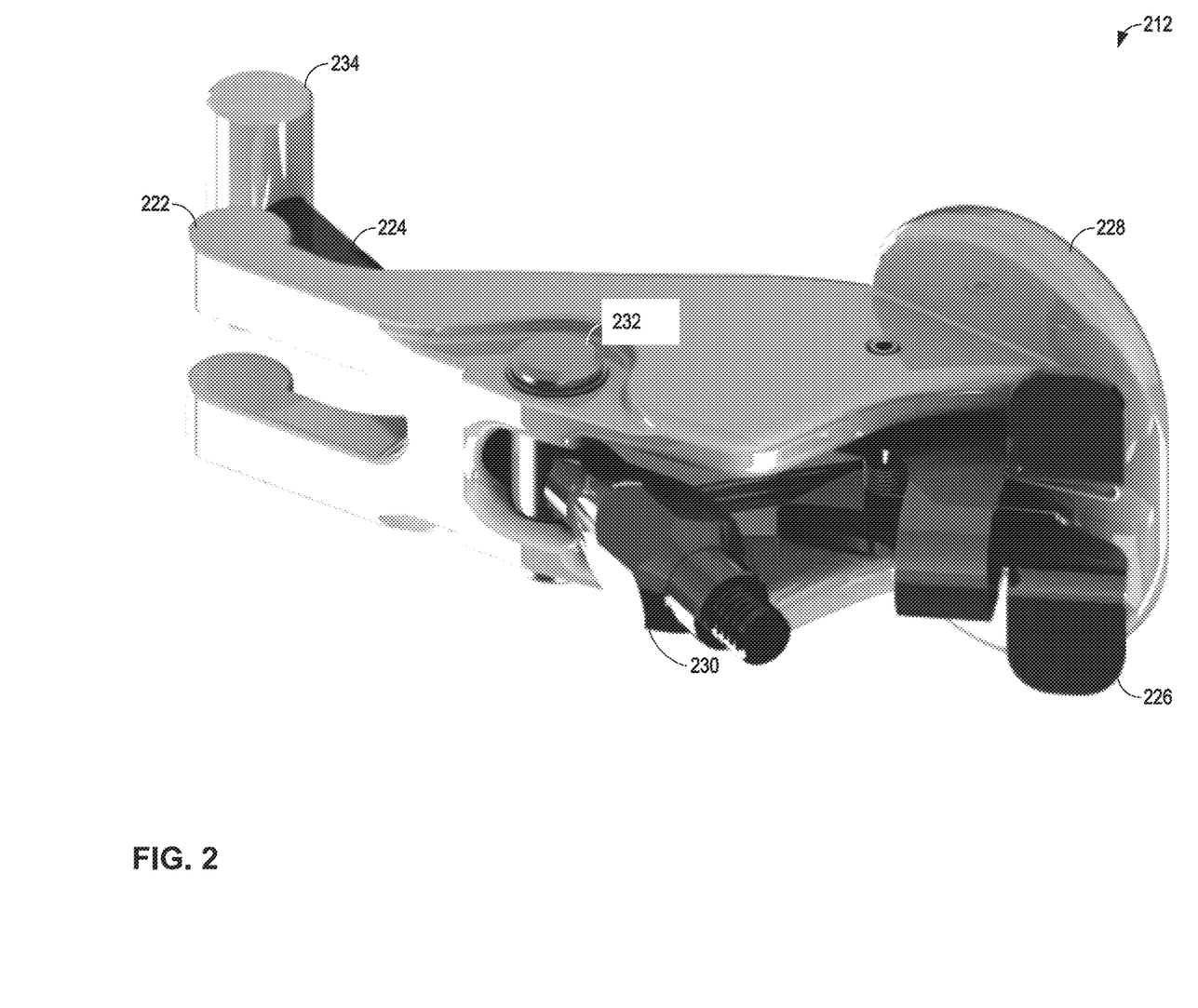
FIG. 2 is a perspective view of an unclasped latch body in accordance with one or more aspects of the current disclosure.

FIG. 2 is a perspective view of an example configuration of an unclasped latch 212 in accordance with one or more aspects of the current disclosure. In the example of FIG. 2, latch 212 includes clasp end 222, latch rod 224, locking mechanism 226, flat base 228, adjustment knob 230, and pin 232. The end of latch rod 224 that is opposite of adjustment knob 230 is inserted into axel 234, which may be a part of a bracket of a screen portion or installed into a bracket of a screen portion (not pictured).

While the example of FIGS. 2-11 show one example of latch 212-1112, other examples may exist that are suitable to lock a screen portion into place but have additional parts or fewer parts than those pictured in FIGS. 2-11. For instance, latch 212 may include a different structure other than adjustment knob 230, or may not include locking mechanism 226. Further, while FIGS. 2-11 use different reference numbers, it should be appreciated that features and elements using the same ending numbers refer to like features and elements in different drawings. For example, reference to latch 12 (212, 312, 412, etc.) in different figures refers to the same latch structure across different figures. Accordingly, discussion of features, designs, and/or modes of use in any one figure for a particular element or aspect of the design can be combined with discussion and teachings for that particular element or aspect of the design in connection with another figure.

With further reference to FIG. 2, clasp end 222 may be a portion of latch 212 that is configured to hook into a cavity of a screen or screen portion. In the example of FIG. 2, clasp end 222 is shown with two prongs with rounded ends to secure clasp end into a cavity of a screen or screen portion. In other examples, clasp end 222 may only have a single prong, or may have three or more prongs. Further, clasp end 222 may have ends shaped like hooks or with squared tips as opposed to rounded ends or yet other shape and/or relative size.

Latch rod 224 may be a structure that extends through a latch 212 and into axel 234 on a first end. Axel 234 may be included as part of a first screen portion, meaning that latch rod 224 essentially connects latch 212 to the first screen portion. Latch rod 224 may either be rounded, squared, or in any other shape that enables latch rod 224 to be inserted into a cavity in axel 234, extend through pin 232, and receive adjustment knob 230. Furthermore, the ends of latch rod 224 may be configured to secure the relative position of latch rod 224 within axel 234 and adjustment knob 230. For instance, the ends of latch rod 224 may have any combination of a screw pattern, a telescoping function, pins, or any other mechanism that adequately holds latch rod 224 in place. In still other configurations, latch rod may be integrally connected to axel 234, e.g., such that the components are formed together and cannot be separated from each other without destroying their material structure. In the example of FIG. 2, latch rod 224 is cylindrical with a screw pattern on both ends of latch rod 224.

Adjustment knob 230 may be any mechanism configured to restrict the movement of latch rod 224 within latch 212 and/or adjust the operative or working length of latch rod 224. For instance, in the example of FIG. 2, adjustment knob 230 is configured to screw around latch rod 224. As adjustment knob 230 travels along latch rod 224 towards the middle of latch rod 224, adjustment knob 230 begins pressing up against pin 232 and a sidewall of latch 212. This restricts the movement of latch rod 224 in latch 212, limiting the rotation of latch rod 224 that can occur. In other words, when latch 212 is in the locked position, the body of latch 212 will hold adjustment knob 230 in place such that adjustment knob 230 does not move.

Locking mechanism 226 may be any mechanism to further restrict the movement of adjustment knob 230 along latch rod 224. For instance, in the example of FIG. 2, locking mechanism 226 includes a loop attached to a hinge of latch 212. The loop of locking mechanism 226 may rise closer to latch rod 224 or fall closer to flat base 228. As locking mechanism 226 rises, and while adjustment knob 230 is tightened around latch rod 224 to secure latch rod 224 from rotating within latch 212, locking mechanism 226 may surround latch rod 224 and a tapered end of adjustment knob 230. When locking mechanism 226 surrounds adjustment knob 230, adjustment knob 230 may be restricted from loosening during the course of normal operation of a dryer system, such as dryer 102 of FIG. 1.

Pin 232 may be any structure that receives latch rod 224 such that latch rod 224 is secured within latch 212 and such that latch rod 224 can rotate through latch 212 when adjustment knob 230 and/or locking mechanism 226 are not activated. For instance, in the example of FIG. 2, pin 232 includes an axel with a cavity extending through the middle of pin 232, the cavity being of a size and a shape consistent with the size and shape of latch rod 224.

In some examples, such as the example of FIG. 2, latch 212 may also have flat base 228. Base 228 may be of any shape suitable for the particular dryer system in which latch 212 is incorporated within. By forming base 228 to be flat, an installer of latch 212 may more easily and comfortably install latch 212, and latch 212 may fit within the dryer system better after installation.

In the example of FIG. 2, clasp end 222 is configured to be inserted into a hinge receiving cavity of a terminal end of a first screen portion of a plurality of screen portions. Pin 232 is rotatable relative to the body of latch 212, with pin 232 defining a latch rod receiving opening extending therethrough that receives latch rod 224 extending from a first end (e.g., the end near axel 234) to a second end (e.g., the end near adjustment knob 230). A terminal end of a second screen portion may include a bracket housing axel 234, and the first end of latch rod 224 is operatively connected to axel 234.

Figure 3:
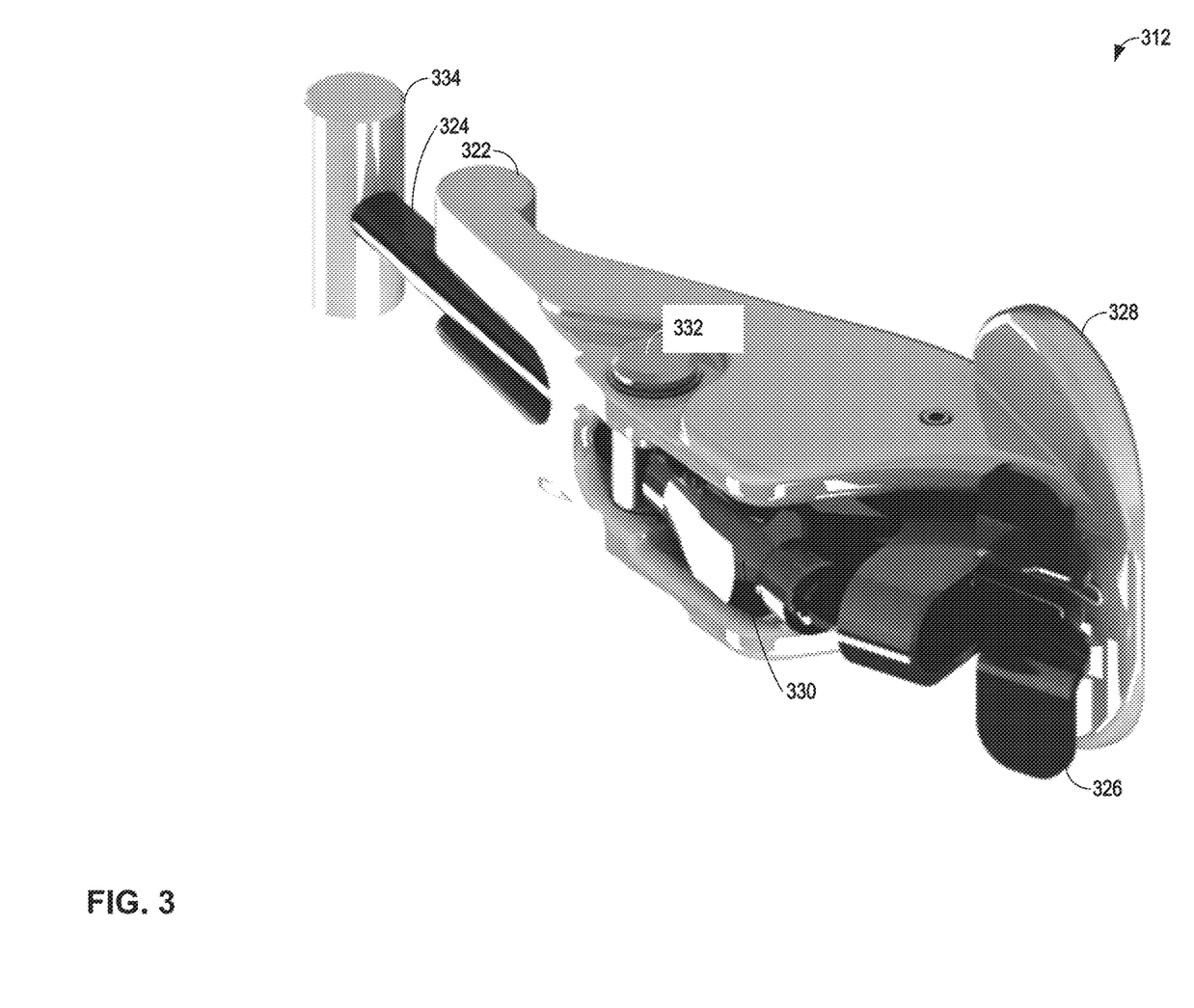
FIG. 3 is a perspective view of a clasped latch body in accordance with one or more aspects of the current disclosure.

FIG. 3 is a perspective view of a clasped latch body in accordance with one or more aspects of the current disclosure. In the example of FIG. 3, latch 312 includes clasp end 322, latch rod 324, locking mechanism 326, flat base 328, adjustment knob 330, and pin 332. The end of latch rod 324 that is opposite of adjustment knob 330 is inserted into axel 334, which may be a part of a bracket of a screen portion or installed in a bracket of a screen portion (not pictured). The structures identified above in FIG. 3 may have similar structure and/or functionality as described with respect to the structures of FIG. 2.

When in clasped position clasp end 322 would generally be inserted into the hinge receiving cavity of the first screen portion (not pictured). Furthermore, adjustment knob 330 may be tightened around latch rod 324 to secure the latch rod in place within latch 312. For instance, pin 332 sits along the latch rod at a position where adjustment knob 230 is secured around the latch rod between pin 332 and the second end of latch rod 324. Adjustment knob 330 is movable along latch rod 324 to adjust both a distance between the first end of latch rod 324 (or axel 334) and hinge 322 and a distance between the first end of latch rod 324 and adjustment knob 330. Latch 312 is configured to rotate around the rotatable connection formed between the hinge receiving cavity and clasp end 322 of latch 312, thereby pulling pin 332 and the second end of latch rod 324 inserted therethrough away from the first screen portion. As adjustment knob 330 moves along latch rod 324 towards the first end of latch rod 324 (i.e., the end near axel 334), the rotatable movement of latch rod 324 is restricted.

Figure 4:
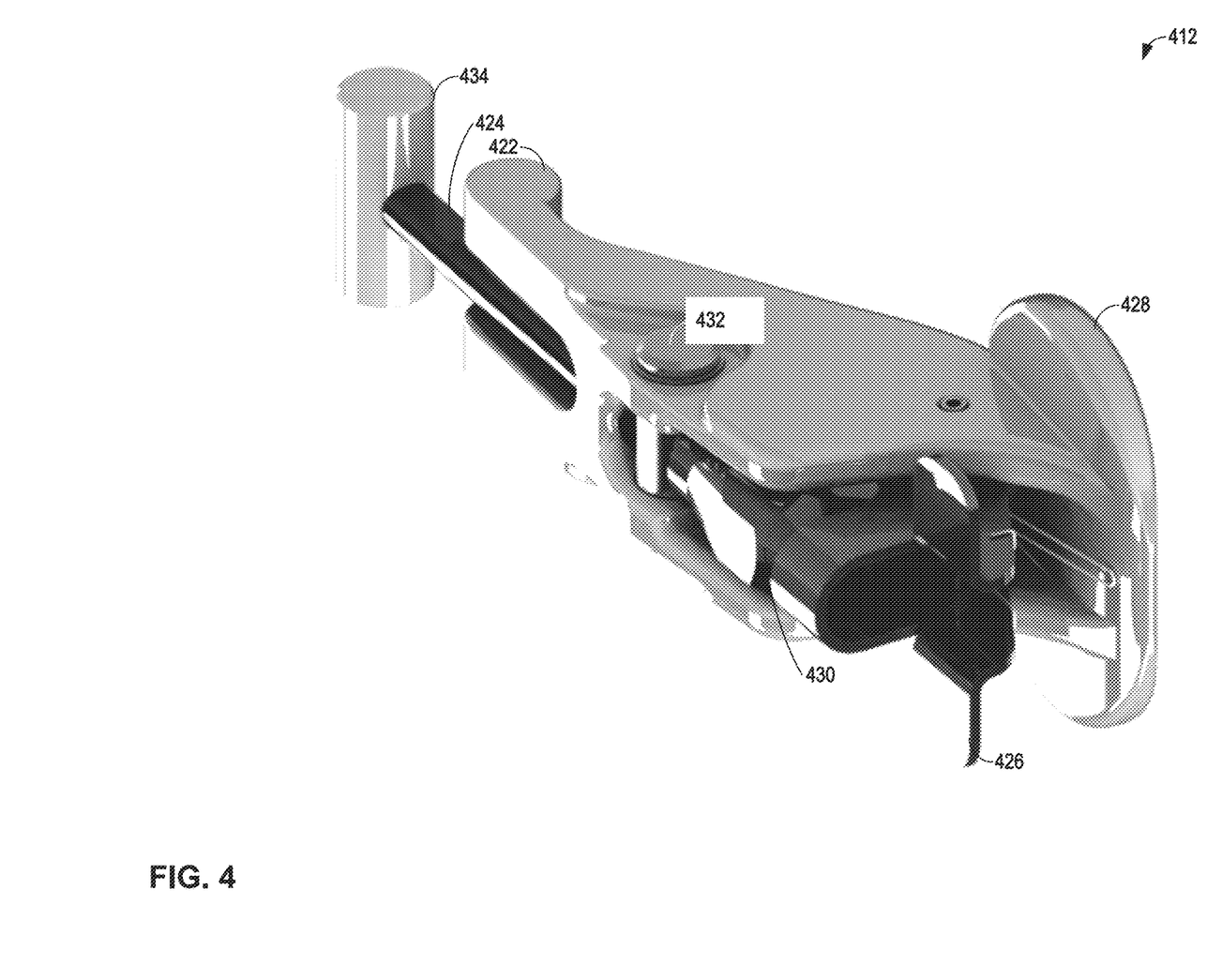
FIG. 4 is a perspective view of a clasped and locked latch body in accordance with one or more aspects of the current disclosure.

FIG. 4 is a perspective view of a clasped and locked latch body in accordance with one or more aspects of the current disclosure. In the example of FIG. 4, latch 412 includes clasp end 422, latch rod 424, locking mechanism 426, flat base 428, adjustment knob 430, and pin 432. The end of latch rod 424 that is opposite of adjustment knob 430 is inserted into axel 434, which may be a part of a bracket of a screen portion or installed in a bracket of a screen portion (not pictured). The structures identified above in FIG. 4 may have similar structure and/or functionality as described with respect to the structures of FIGS. 2 and 3.

When in clasped position, latch 412 is in a position to that described with respect to FIG. 3. When in locked position, locking mechanism 426 is engaged, restricting motion of 424 latch rod and adjustment knob 430. For instance, when locking mechanism 426 is engaged, locking mechanism 426 may keep latch 412 from moving to an open position, as well as restricting adjustment knob 430 from loosening, such as due to vibrations of the dryer system on which latch 412 is installed. As such, locking mechanism 426 keeps latch 412 tight around the screen portions, keeping the screen portions in place throughout the normal operation of the dryer system. Locking mechanism 426 may have some sort of pressure mechanism, such as a spring or a pin lock, that enables locking mechanism 426 to keep pressure on adjustment knob 430.

Figure 5:
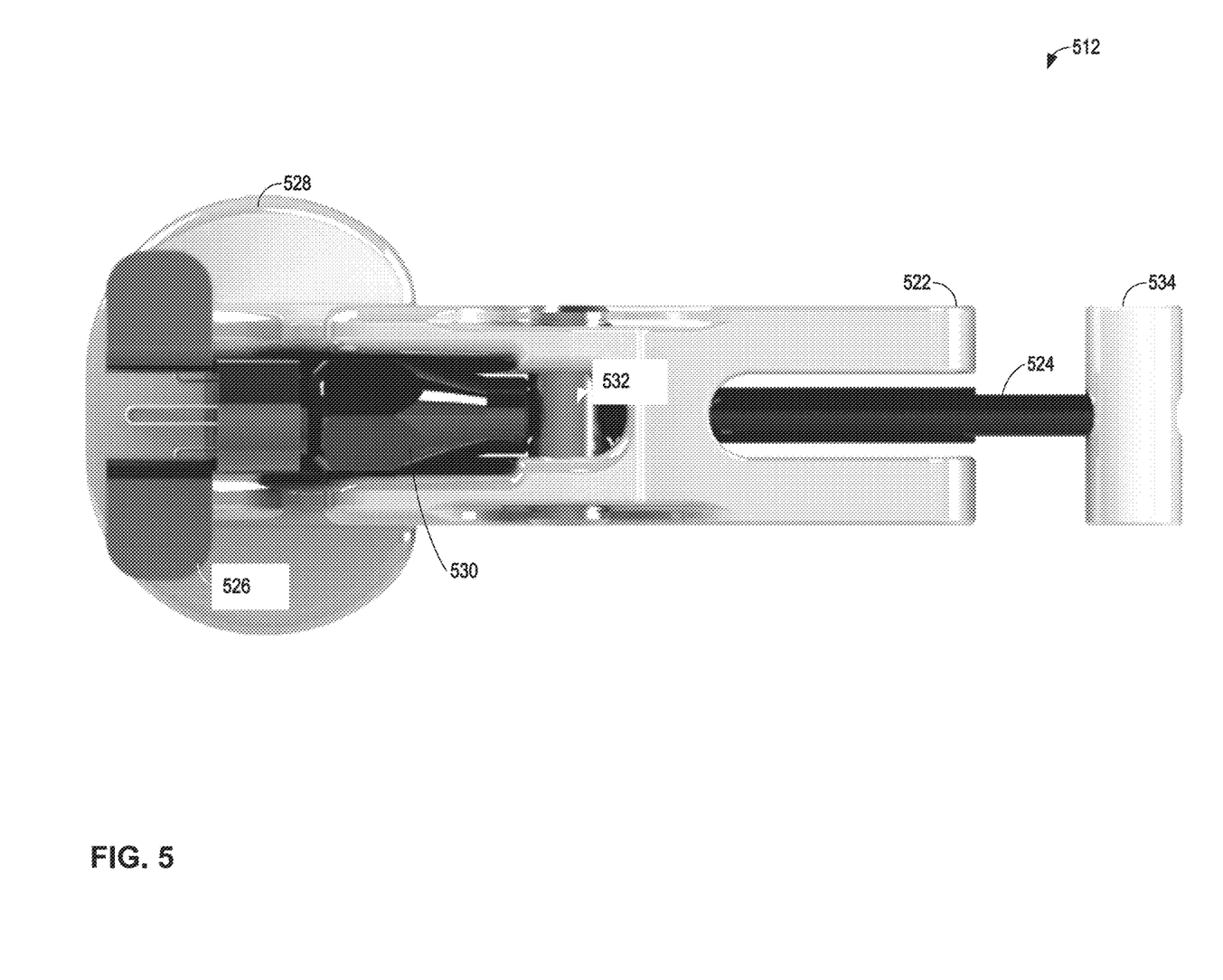
FIG. 5 is a bottom view of a clasped and locked latch body in accordance with one or more aspects of the current disclosure.

FIG. 5 is a bottom view of a clasped and locked latch body in accordance with one or more aspects of the current disclosure. In the example of FIG. 5, latch 512 includes clasp end 522, latch rod 524, locking mechanism 526, flat base 528, adjustment knob 530, and pin 532. The end of latch rod 524 that is opposite of adjustment knob 530 is inserted into axel 534, which may be a part of a bracket of a screen portion or installed in a bracket of a screen portion (not pictured). The structures identified above in FIG. 5 may have similar structure and/or functionality as described with respect to the structures of FIGS. 2-4. Latch 512 may be in a similar position as that described with respect to FIG. 4. Rather, FIG. 5 simply shows a different perspective of latch 412.

Figure 6:
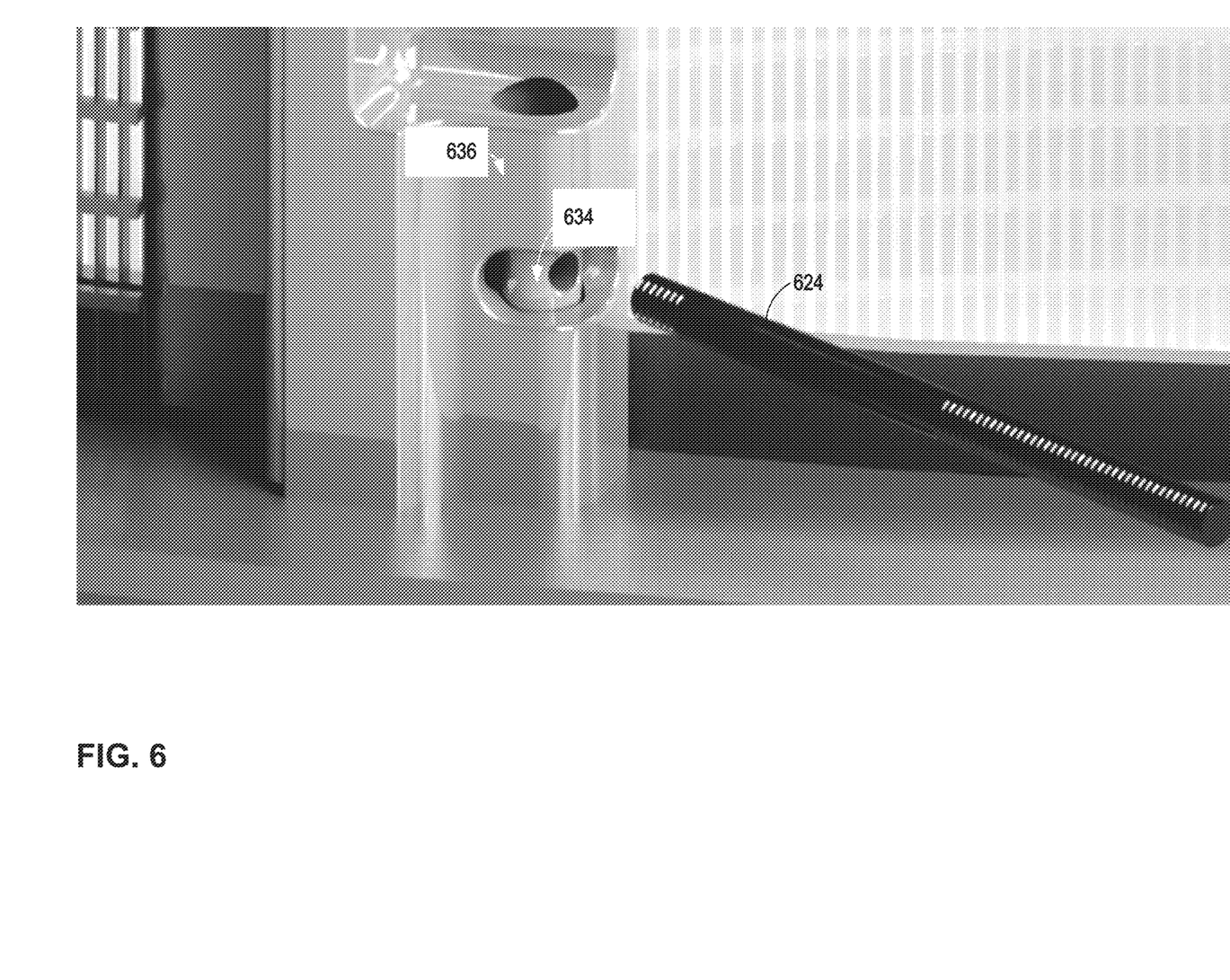
FIG. 6 is a perspective view of a screen portion with an axel and a latch rod in accordance with one or more aspects of the current disclosure.

FIG. 6 is a perspective view of a screen portion with an axel and a latch rod in accordance with one or more aspects of the current disclosure. In the example of FIG. 6, screen portion 636 includes axel 634, which is rotatably disposed in a bracket of screen portion 636. In the example of FIG. 6, screen portion 636 includes a disruptor bar, which is fixed in the dryer structure. Latch rod 624 may be part of a latch body, which is not pictured. The structures identified above in FIG. 6 may have similar structure and/or functionality as described with respect to the structures of FIG. 2.

In the example of FIG. 6, latch rod 624 is configured to have two threaded ends such that latch rod 624 may screw into a reverse threaded pattern inside a cavity of axel 634, as well as a reverse threaded pattern inside a cavity of an adjustment knob (not pictured). For instance, latch rod 624 may include right-handed male threads on both ends, and an inside cavity of axel 634 and an inside cavity of the adjustment knob may have right-handed female threads. This enables latch rod 624 to be inserted and secured within axel 634, as well as the adjustment knob. Furthermore, axel 634 may be rotatable within screen portion 636. When latch rod 624 is inserted into axel 634 and connected to the latch, this enables the latch to rotate around first screen portion 636 to connect to a second screen portion (not pictured).

Figure 7:
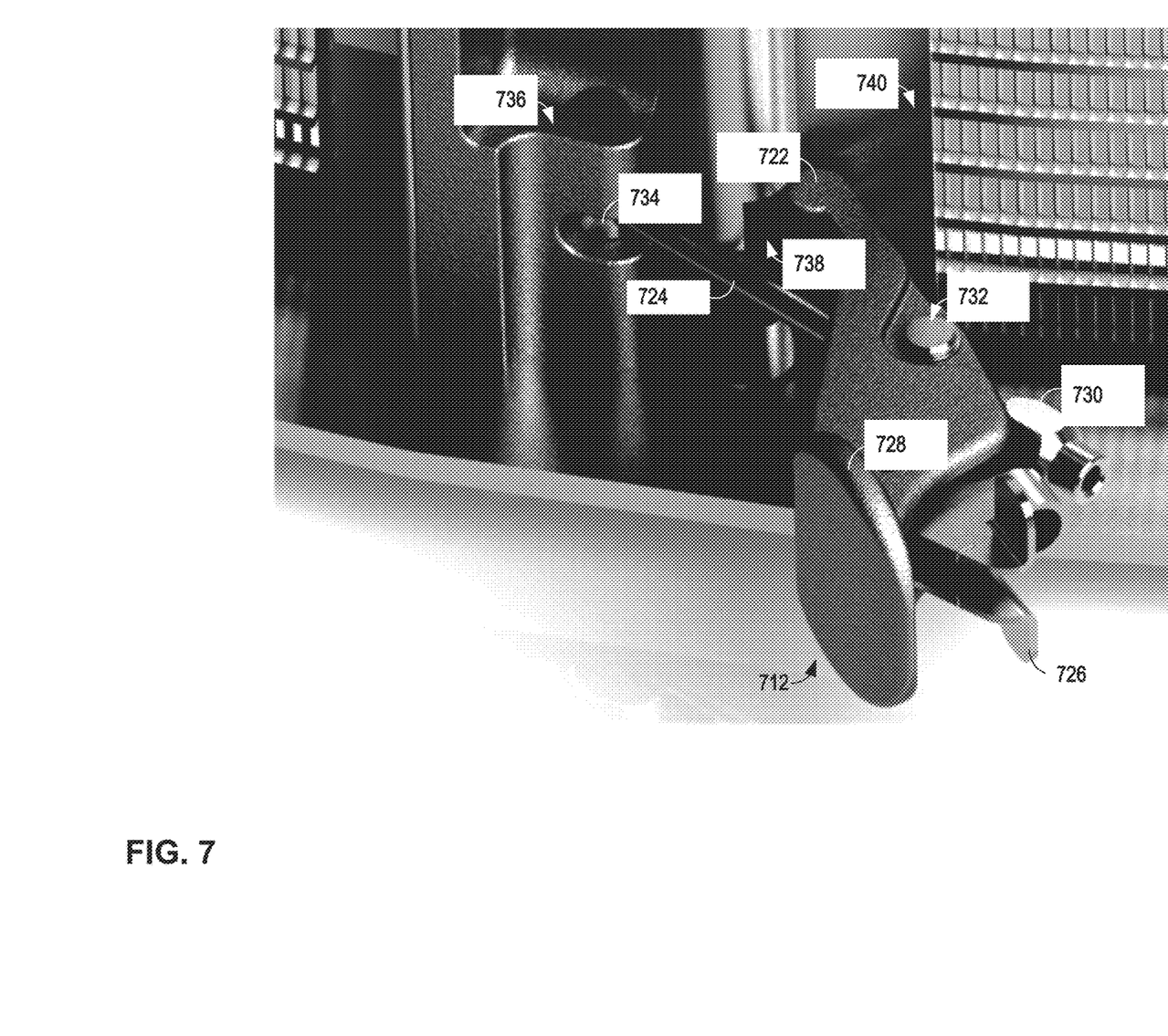
FIG. 7 is a perspective view of a latch body connected to a first screen portion via a latch rod in accordance with one or more aspects of the current disclosure.

FIG. 7 is a perspective view of a latch body connected to a first screen portion via a latch rod in accordance with one or more aspects of the current disclosure. In the example of FIG. 7, latch 712 includes clasp end 722, latch rod 724, locking mechanism 726, flat base 728, adjustment knob 730, and pin 732. The end of latch rod 724 that is opposite of adjustment knob 730 is inserted into axel 734, which may be a part of a bracket of screen portion 736 or installed in a bracket of screen portion 736. The structures identified above in FIG. 7 may have similar structure and/or functionality as described with respect to the structures of FIGS. 2-6.

As shown in FIG. 7, latch rod 724 is screwed into axel 734 of screen portion 736. Screen portion 740 is also included in the example of FIG. 7. Screen portion 740 includes hinge receiving cavity 738, which is configured to receive clasp end 722 and to hold clasp end 722, and thereby hold latch 712, in place when adjustment knob 730 is tightened around latch rod 724. An installer of latch 712 may utilize base 728 to move latch 712 relative to axel 734, screen portions 736 and 740, and hinge receiving cavity 738. This movement is enabled by the rotatable axel 734 and rotatable pin 732, each of which include cavities that receive latch rod 724. As shown in the below figures, when latch 712 is in a clasped and/or locked position latch 712 will bring screen portions 736 and 740 together in a fixed relative position.

The example of FIG. 7 shows a plurality of screen portions 736 and 740, including screen portion 736 having a terminal end and screen portion 740 having a terminal end. The terminal end of screen portion 736 includes a bracket housing axel 734. The terminal end of screen portion 740 defines hinge receiving cavity 738.

Latch rod 724 extends from axel 734 and through pin 732 in latch 712. The first end of latch rod 724 is operatively connected to axel 734 in the bracket housing.

Latch 712 further includes clasp end 722 and pin 732. Pin 732 is rotatable relative latch 712. Pin 732 also defines a latch rod receiving opening extending therethrough that receives latch rod 724.

Clasp end 722 of latch 712 may be inserted into hinge receiving cavity 738 of screen portion 740 to form a rotatable connection therebetween. Latch 712 is configured to rotate around the rotatable connection formed between hinge receiving cavity 738 and clasp end 722 of latch 712, thereby pulling pin 732 and the second end of latch rod 724 inserted therethrough away from the first screen portion. Adjustment knob 730 is secured around the second end of latch rod 730 and movable along latch rod 724 to adjust a distance between the first end of latch rod 724 and adjustment knob 730.

Screen portions 736 and 740 may have a variety of configurations. In some instances, a mesh of screen portion 736 has one or more openings having a size different than a size of one or more openings of a mesh of screen portion 738. In other instances, the meshes of screen portions 736 and 740 may have uniform sizes. In some examples, screen portion 736 and screen portion 740 are opposite ends of a singular screen. In other examples, screen portion 736 and screen portion 740 are two different screens. In still other instances, screen portion 736 may not be a screen at all, but may instead be a disruptor bar that includes the bracket, screen portion 740 may be a frame and a screen. In such instances, the various screens that would be included in the dryer system would attach to disruptor bars placed around the internal reservoirs of the dryer system as opposed to being attached to one another. In general, a latch described herein, such as latch 712, may secure one end of a screen either to itself, to another screen, or to a fixture within a dryer system such that the screen is held in relative position to the dryer system.

Figure 8:
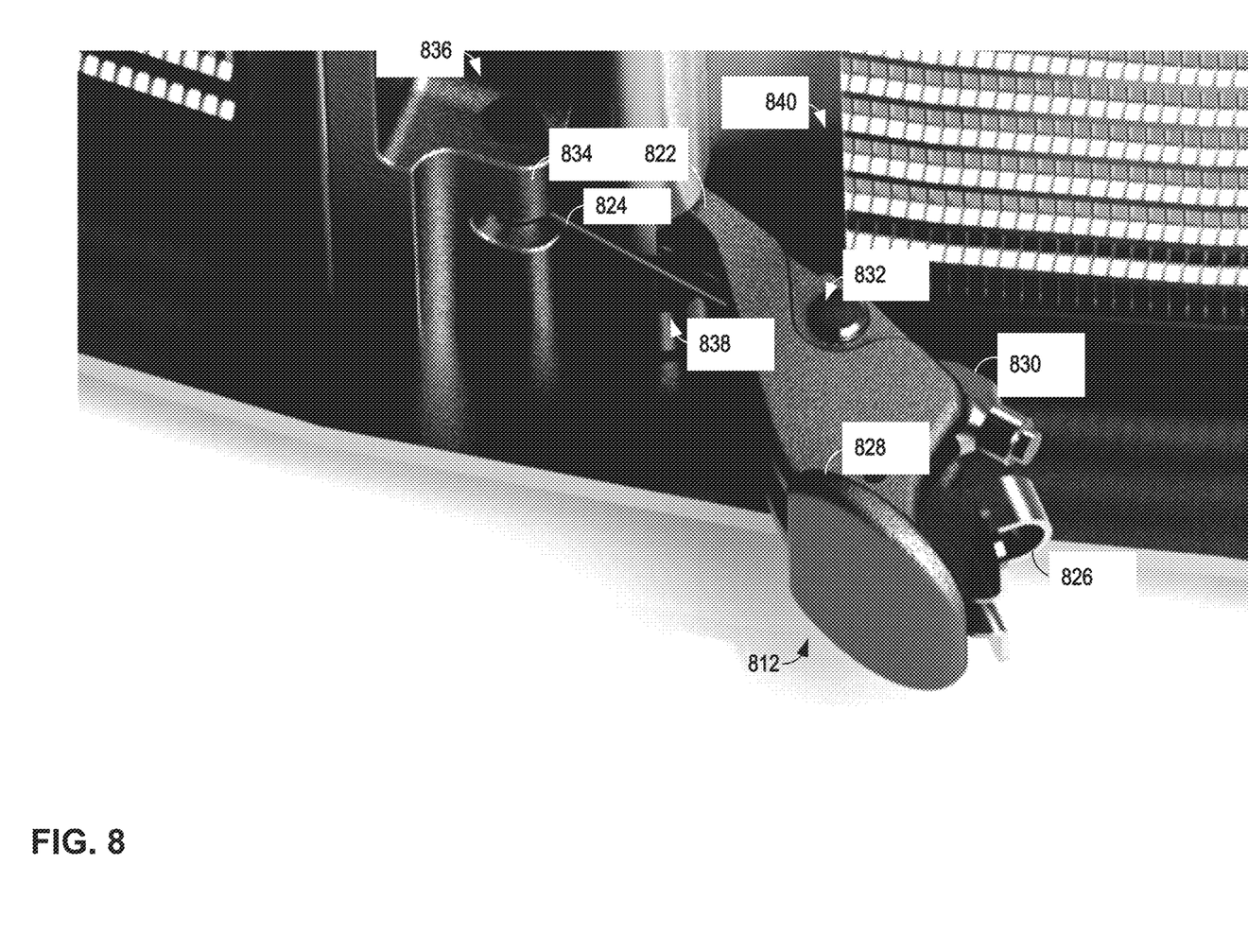
FIG. 8 is a perspective view of a latch body connected to a first screen portion via a latch rod and with a clasp end of the latch body inserted into a hinge receiving cavity of a second screen portion in accordance with one or more aspects of the current disclosure.

FIG. 8 is a perspective view of latch 812 connected to screen portion 836 via latch rod 824 and with clasp end 822 of latch 812 inserted into hinge receiving cavity 838 of screen portion 840 in accordance with one or more aspects of the current disclosure. In the example of FIG. 8, latch 812 includes clasp end 822, latch rod 824, locking mechanism 826, flat base 828, adjustment knob 830, and pin 832. The end of latch rod 824 that is opposite of adjustment knob 830 is inserted into axel 834, which may be a part of a bracket of screen portion 836 or installed in a bracket of screen portion 836. The structures identified above in FIG. 8 may have similar structure and/or functionality as described with respect to the structures of FIG. 2.

In the example of FIG. 8, adjustment knob 830 is movable along latch rod 824 by rotating adjustment knob 830 around the threaded end of latch rod 824 (as shown in FIG. 6) while the threaded end of latch rod 824 is inserted into the threaded opening of adjustment knob 830. As adjustment knob 830 rotates around latch rod 824, latch 812 can rotate relative to hinge receiving cavity 838 and axel 834 towards screen portion 840, tightening the connection between screen portions 836 and 840 and latch 812. An installer may apply force to base 828, which is configured to receive pressure that moves latch 812 into a closed position (e.g., a clasped position).

Figure 9:
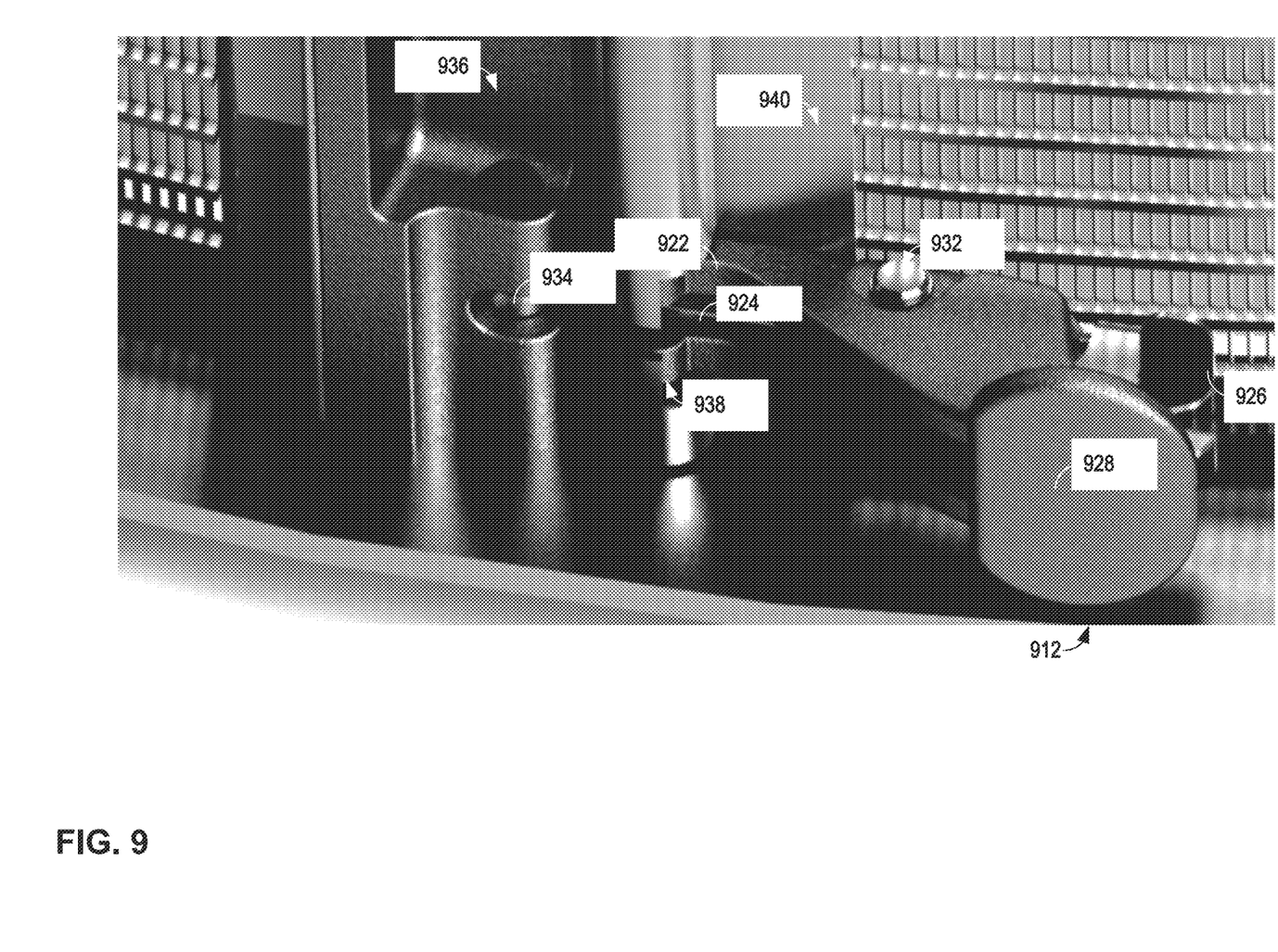
FIG. 9 is a perspective view of a locked latch body connected to a first screen portion via a latch rod and with a clasp end of the latch body inserted into a hinge receiving cavity of a second screen portion in accordance with one or more aspects of the current disclosure.

FIG. 9 is a perspective view of a locked latch body connected to a first screen portion via a latch rod and with a clasp end of the latch body inserted into a hinge receiving cavity of a second screen portion in accordance with one or more aspects of the current disclosure. In the example of FIG. 9, latch 912 includes clasp end 922, latch rod 924, locking mechanism 926, flat base 928, an adjustment knob (not pictured), and pin 932. The end of latch rod 924 that is opposite of the adjustment knob is inserted into axel 934, which may be a part of a bracket of screen portion 936 or installed in a bracket of screen portion 936. The structures identified above in FIG. 9 may have similar structure and/or functionality as described with respect to the structures of FIG. 2.

While not visible in FIG. 9, the adjustment knob is fully secured around latch rod 924, causing latch 912 to rest against screen portion 940. With latch rod 924 being operatively connected to axel 934 via the thread on one end of latch rod 924 and being operatively connected to the adjustment knob, as the threads on latch rod 924 are tightened into each of axel 934 and the adjustment knob, screen portion 936 and latch 912 are drawn closer together. Further, with clasp end 922 being secured in hinge receiving cavity 938, the tightening of latch 912 and screen portion 936 also draws screen portion 940 to screen portion 936. By resting against screen portion 940, latch 912 holds screen portions 936 and 940 in place while not interfering with the operation of the dryer system as a whole.

In the example of FIG. 9, locking mechanism 926 is engaged. When locking mechanism 926 is engaged, locking mechanism 926 restricts motion of latch rod 924 and the adjustment knob such that the adjustment knob maintains tension on latch rod 924 and latch 912.

Figure 10:
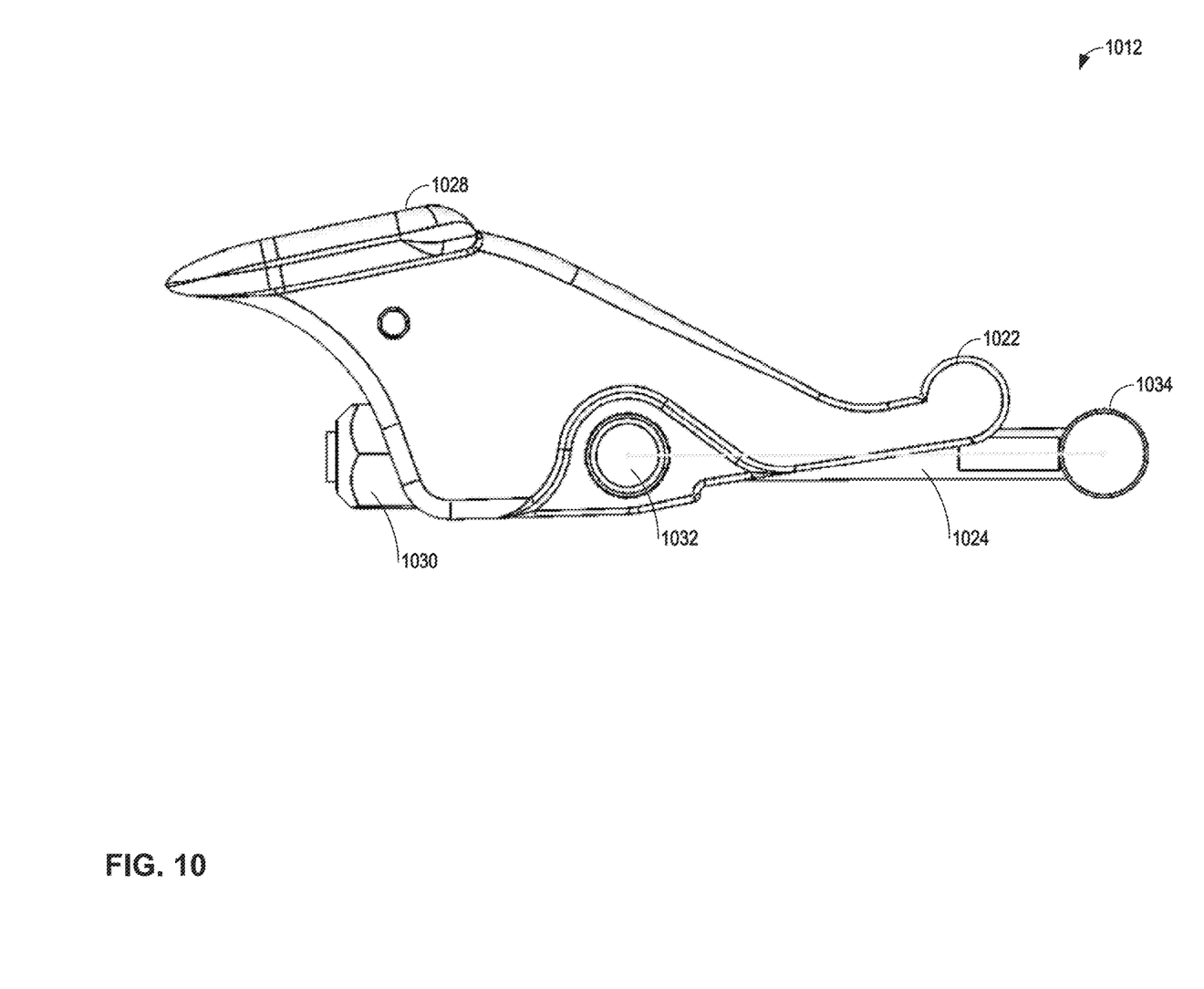
FIG. 10 is a side view of a clasped latch body in accordance with one or more aspects of the current disclosure.

FIG. 10 is a side view of a clasped latch body 1012 in accordance with one or more aspects of the current disclosure. In the example of FIG. 10, latch 1012 includes clasp end 1022, latch rod 1024, flat base 1028, adjustment knob 1030, and pin 1032. The end of latch rod 1024 that is opposite of adjustment knob 1030 is inserted into axel 1034, which may be a part of a bracket of a screen portion installed in the screen portion. The structures identified above in FIG. 10 may have similar structure and/or functionality as described with respect to the structures of FIG. 2.

The example of FIG. 10 shows an "over-center geometry" embodied by latch 1012. Once latch 1012 is installed (e.g., clasp end 1022 is inserted into a screen portion and adjustment knob 1030 is tightened around latch rod 1024), there is tension between pin 1032 and axel 1034. When over-center with the pin end of latch 1012, there is enough force to keep latch 1012 from popping open. Adjustment knob 1030 is sized so that when in the closed position adjustment knob 1030 is unable to rotate.

Figure 11:
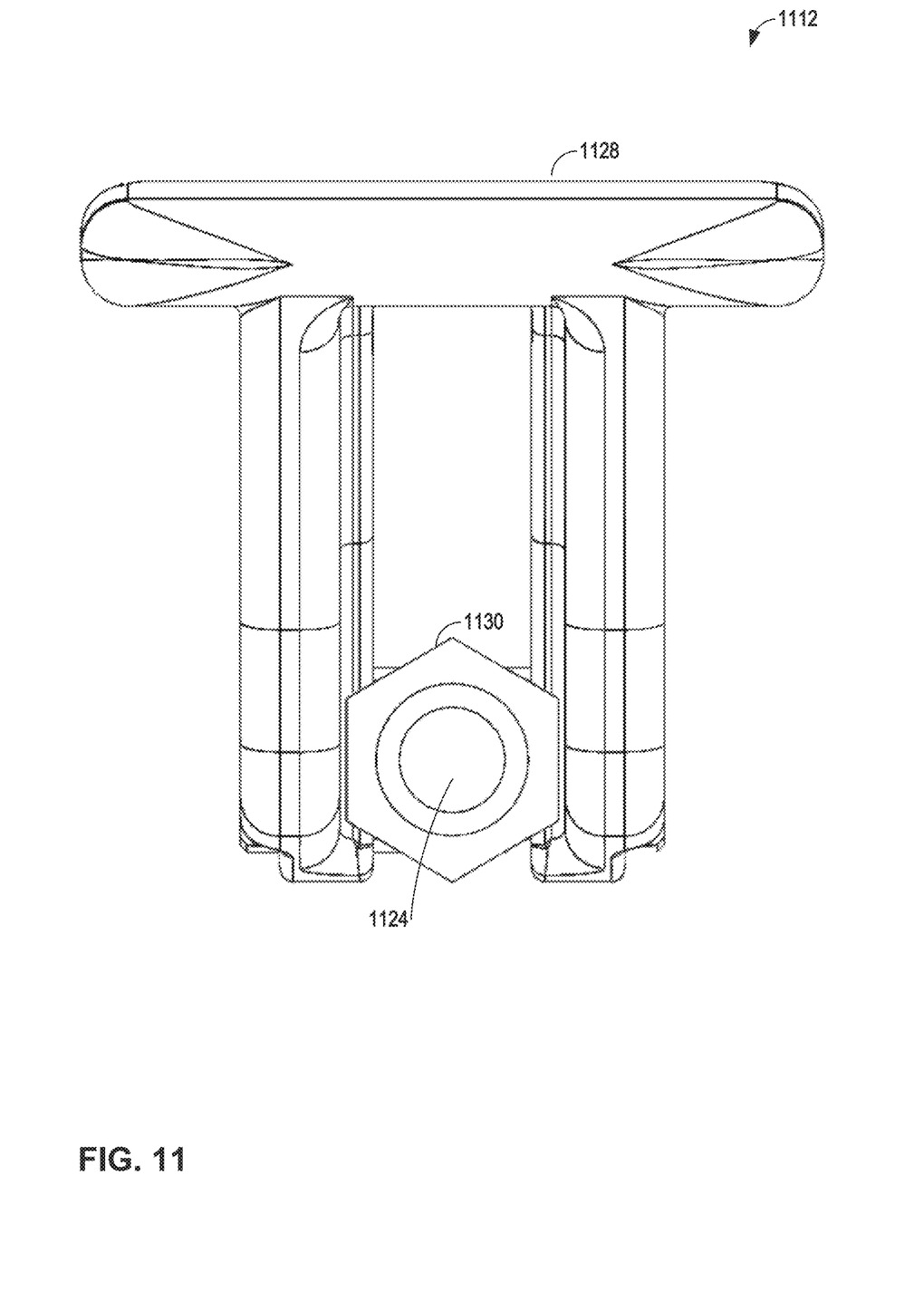
FIG. 11 is a rear view of a clasped latch body in accordance with one or more aspects of the current disclosure.

FIG. 11 is a rear view of a clasped latch body in accordance with one or more aspects of the current disclosure. In the example of FIG. 11, latch 1112 includes a clasp end (not pictured), latch rod 1124, flat base 1128, adjustment knob 1130, and a pin (not pictured). The end of latch rod 1124 that is opposite of adjustment knob 1130 is inserted into an axel (not pictured), which may be a part of a bracket of a screen portion installed in the screen portion. The structures identified above in FIG. 11 may have similar structure and/or functionality as described with respect to the structures of FIG. 2.

As shown in FIG. 11, when adjustment knob 1130 is tightened around latch rod 1124, the body of latch 1112 holds adjustment knob in place. Furthermore, the portion of latch 1112 that is connected to the screen portions, such as the clasp end and the opposite end of latch rod 1124, are not visible when viewed at a direct angle due to the over-center geometry formed by latch 1112 when in a locked position.

Figure 12:
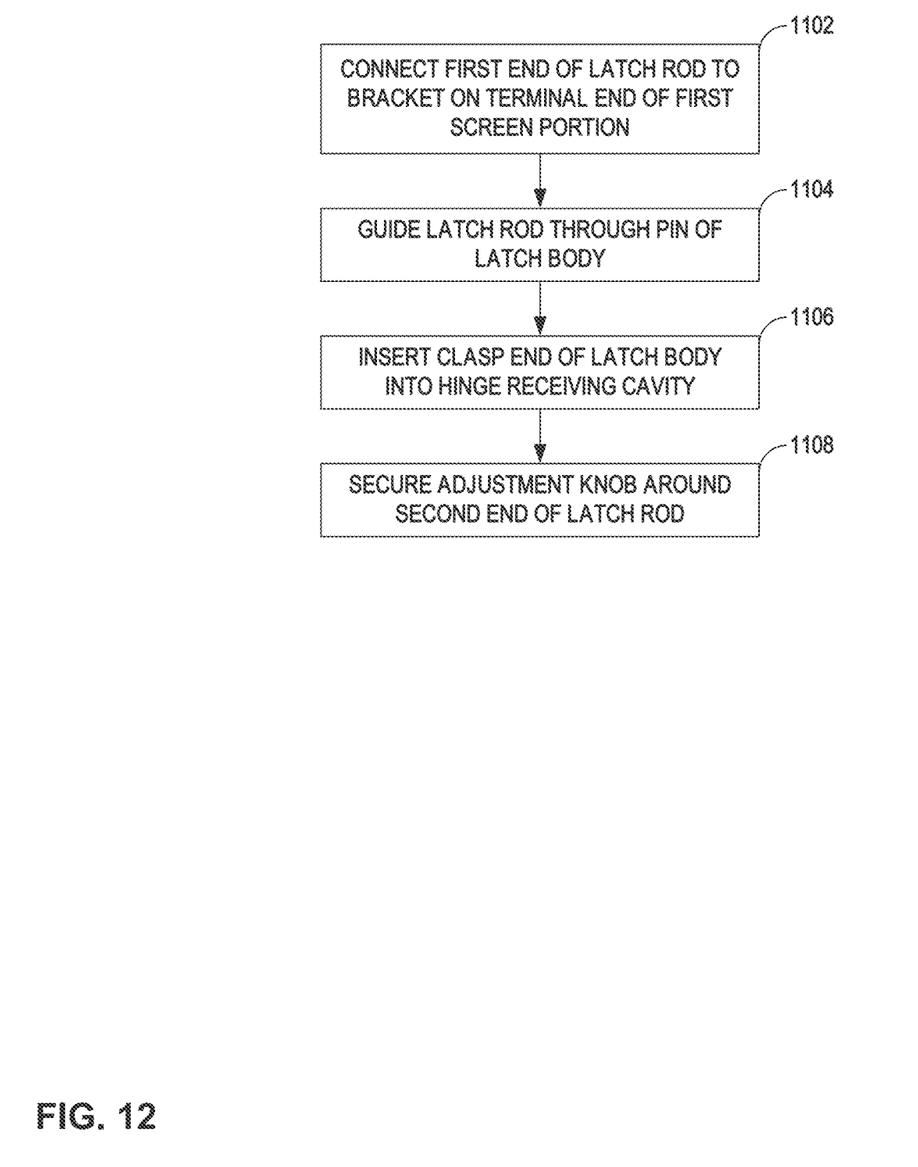
FIG. 12 is a flow diagram illustrating a method for assembling a screen system, in accordance with one or more aspects of the current disclosure.

FIG. 12 is a flow diagram illustrating a method for assembling a screen system, in accordance with one or more aspects of the current disclosure. The techniques of FIG. 12 may be performed for a dryer, such as dryer 102 of FIG. 1, using a particular latch, such as latch 712 of FIG. 7, on screen portions, such as those defined in FIG. 7. For purposes of illustration only, the techniques of FIG. 12 are described within the context of FIG. 7, although other configurations may also be utilized.

The method includes connecting a first end of latch rod 724 to a bracket on a terminal end of first screen portion 736 of a plurality of screen portions, the bracket housing axel 734 (1202). The method also includes guiding, from a second end the latch rod 724, latch rod 724 through pin 732 of latch 712 (1204). Latch 712 also includes a clasp end 722. The method further includes inserting clasp end 722 of latch 712 into hinge receiving cavity 738 of a terminal end of a second screen portion of a plurality of screen portions (1206). The method also includes securing adjustment knob 730 around the second end of latch rod 724 (1208). Securing the adjustment knob around the second end of latch rod 724 rotates latch 712 around the rotatable connection formed between hinge receiving cavity 738 and clasp end 722 of latch 712, thereby pulling pin 732 and the second end of latch rod 724 inserted therethrough away from first screen portion 736.

It is to be recognized that depending on the example, certain acts or events of any of the techniques described herein can be performed in a different sequence, may be added, merged, or left out altogether (e.g., not all described acts or events are necessary for the practice of the techniques).

Various examples of the disclosure have been described. Any combination of the described systems, operations, or functions is contemplated. These and other examples are within the scope of the following claims.

The invention claimed is:

1. A screen system comprising:
    a plurality of screen portions, including a first screen portion having a terminal end and a second screen portion having a terminal end, wherein the terminal end of the first screen portion comprises a bracket housing an axel and the terminal end of the second screen portion defines a hinge receiving cavity;
    a latch rod extending from a first end to a second end, wherein the first end of the latch rod is operatively connected to the axel in the bracket housing;
    a latch body comprising a clasp end and having a pin rotatable relative to the latch body;
    wherein the clasp end of the latch body is inserted into the hinge receiving cavity of the second screen portion to form a rotatable connection therebetween,
    the second end of the latch rod is operatively connected to the pin, and
    the latch body is configured to rotate around the rotatable connection formed between the hinge receiving cavity and the clasp end of the latch body, thereby pulling the pin and the second end of the latch rod connected thereto away from the first screen portion.

2. The screen system of claim 1, wherein the latch body further comprises a locking mechanism that, when engaged, restricts motion of the latch rod.

3. The screen system of claim 1, wherein the first screen portion and the second screen portion comprise two different screens.

4. The screen system of claim 1, wherein the first screen portion comprises a disruptor bar that includes the bracket, and wherein the second screen portion comprises a frame and a screen.

5. The screen system of claim 1, wherein the latch body further comprises a base configured to receive pressure that moves the latch body into a closed position.

6. The screen system of claim 1, further comprising an adjustment knob, wherein the adjustment knob is secured around the second end of the latch rod and movable along the latch rod to adjust a distance between the first end of the latch rod and the adjustment knob.

7. The screen system of claim 6, when the adjustment knob is fully secured around the latch rod, the latch body rests against the second screen portion.

8. The screen system of claim 6, wherein the second end of the latch rod comprises a threaded end, wherein the adjustment knob has a threaded opening that receives the threaded end of the latch rod, and wherein the adjustment knob is movable along the latch rod by rotating the adjustment knob around the threaded end of the latch rod while the threaded end of the latch rod is inserted into the threaded opening of the adjustment knob.

9. The screen system of claim 1, wherein the pin defines a latch rod receiving opening extending at least partially therethrough, and the second end of the latch rod is inserted into the latch rod receiving opening of the pin.

10. The screen system of claim 1, wherein the first end of the latch rod comprises a threaded end, and wherein the axel comprises a threaded opening that receives the threaded end of the latch rod.

\* \* \* \* \*